UNITED STATES PATENT OFFICE.

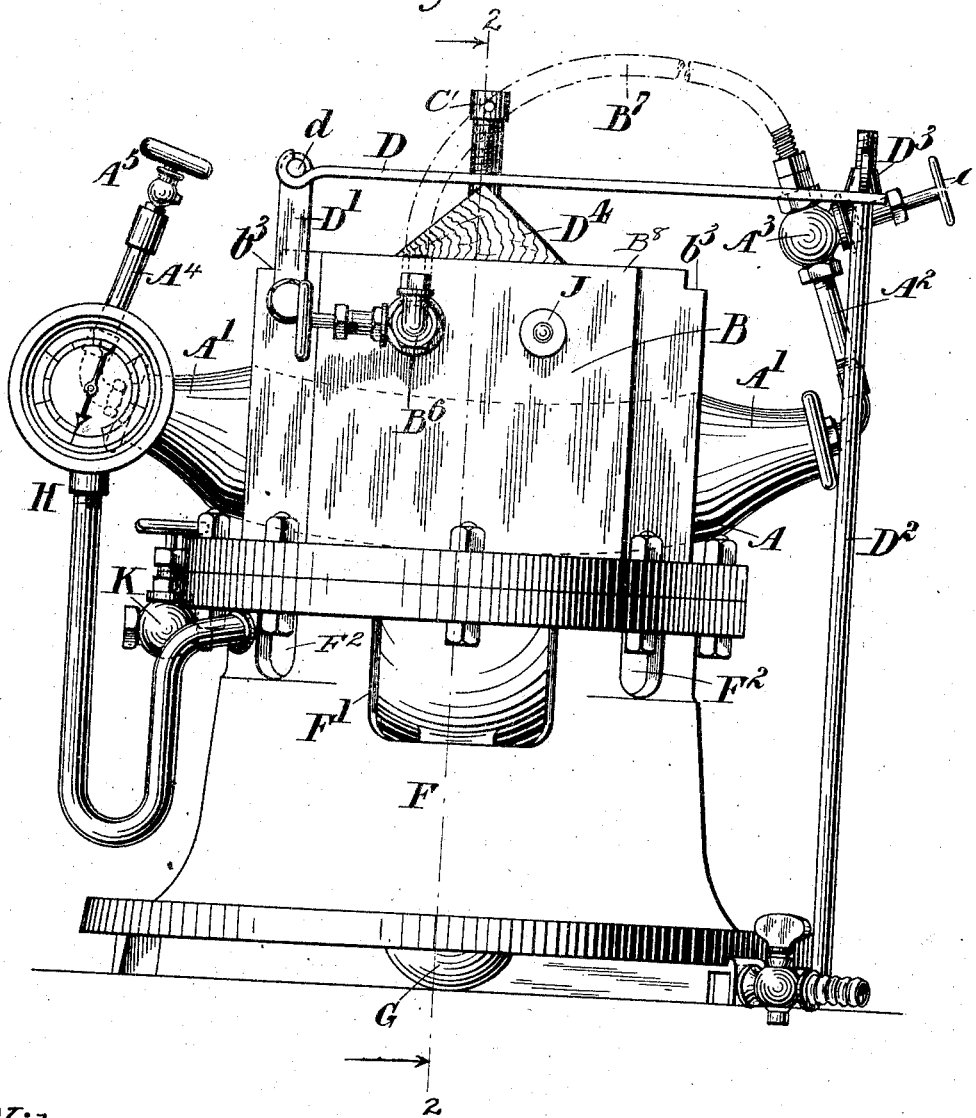

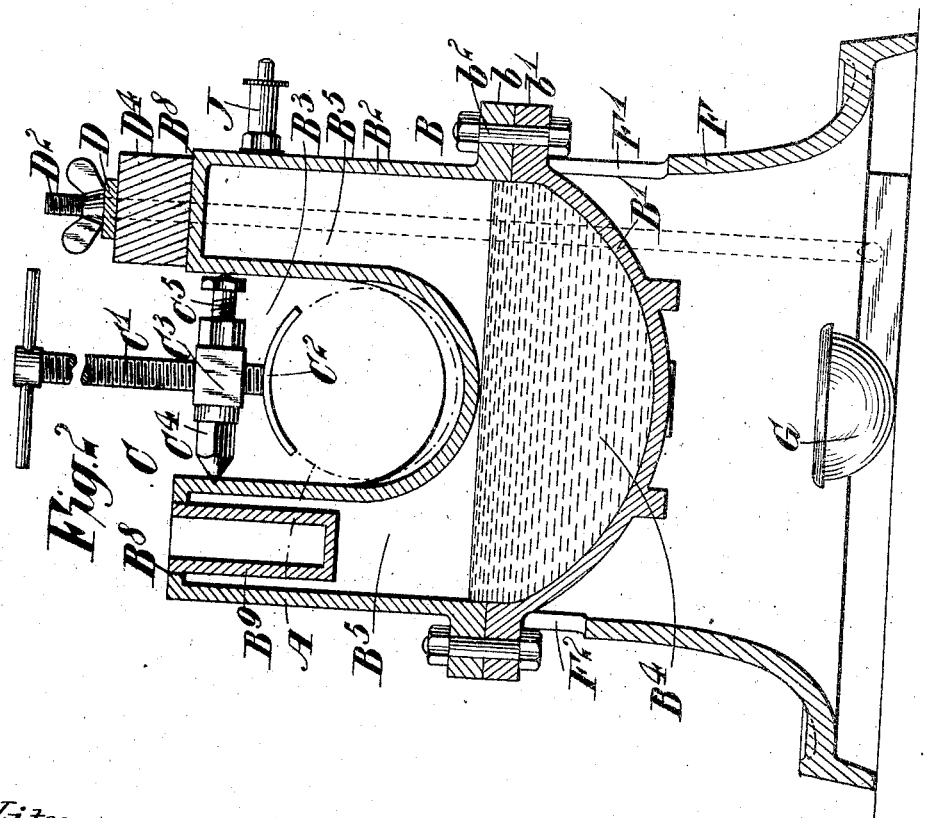

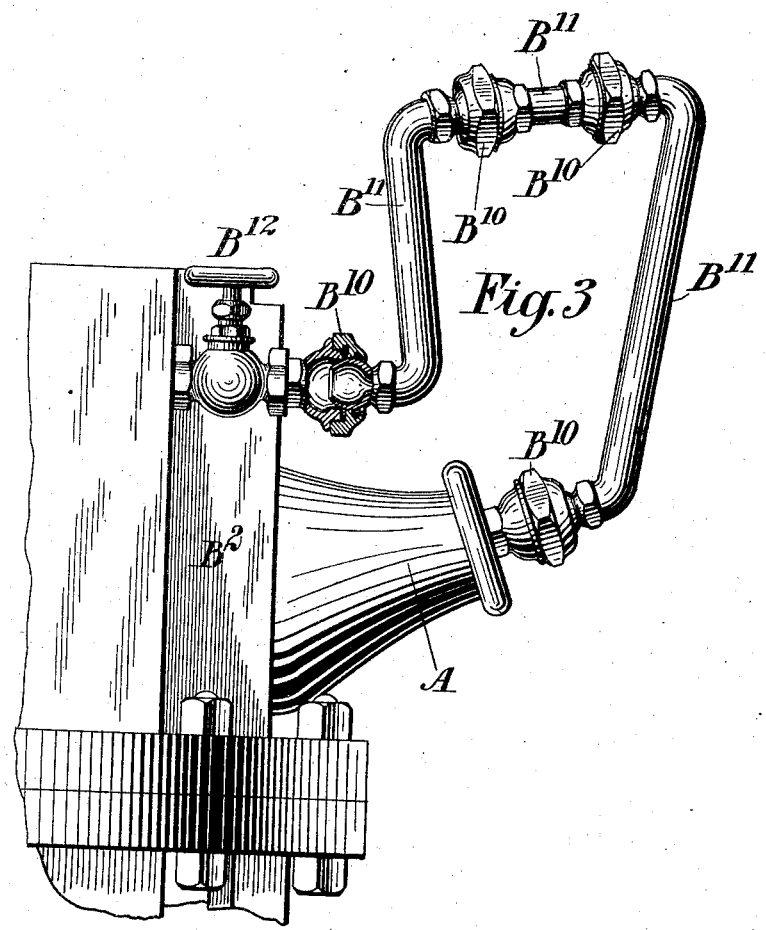

HENRY HARVEY FROST, OF LONDON, ENGLAND, ASSIGNOR TO HARVEY FROST & COMPANY, LIMITED, OF LONDON, ENGLAND.

VULCANIZING APPARATUS.

No. 846,408.      Specification of Letters Patent.      Patented March 5, 1907.

Application filed December 29, 1904. Serial No. 238,715.

*To all whom it may concern:*

Be it known that I, HENRY HARVEY FROST, a subject of the King of England, and residing at London, England, have invented certain new and useful Improvements in or Relating to Vulcanizing Apparatus, of which the following is a specification.

This invention relates to vulcanizing apparatus applicable in various ways, but having particular reference to apparatus for repairing or re-covering pneumatic-tire covers or for jointing the ends of pneumatic tires for motor-vehicles and the like. Such pneumatic-tire covers frequently become punctured or worn out in parts, and it is necessary to repair these thoroughly, or otherwise the cover will be useless. For replacing the part worn out or for filling up the puncture a composition is employed which is plastic in its nature and can readily be placed in position, it being, however, necessary to vulcanize this composition by means of heat in order that it may remain in position and stand the necessary wear, the heating or vulcanizing causing the patch or insertion to actually become part of the cover.

My invention has for its object the provision of means for subjecting both sides of the tire-cover to heat and for applying this heat equally and evenly over the part to be treated, so as to assure that the patch will be thoroughly treated.

My invention also includes means for applying the heat in such a manner as to avoid overcooking at any part.

My invention further includes the provision of two members, both of which are heated, one member being shaped and adapted to treat the inner surface of the tire-cover and the other being shaped and adapted to treat the outer surface thereof.

My invention also includes means for independently regulating the heat of the member for treating the inner surface of the cover.

I will now describe the device embodying my invention illustrated in the accompanying drawings and will thereafter point out my invention in claims.

Figure 1 shows a preferred form of the two vulcanizing members consisting of the hollow mandrel A and an apparatus for supplying heat to the mandrel and having a channel or mold which constitutes the second vulcanizing member proper. Fig. 2 is a section on the line 2 2 of Fig. 1. Fig. 3 shows a modified construction of flexible heat-conductor to the mandrel.

Referring more particularly to Figs. 1 and 2, A is the hollow mandrel, which, as shown, is preferably circular in cross-section; but it may be otherwise formed so long as the portion intended to come in contact with the interior of the tire corresponds to the form the tire-cover is intended to take when inflated. The mandrel may be of any convenient length and is curved so as to bear against the interior of the tire-cover. The mandrel in addition to being employed for vulcanizing patches or insertions in the cover may also be employed in conjunction with a second member B for vulcanizing the tire in sections, and obviously as there will be a tendency to overcook or undercook the portions of the tire at the end of the successive sections on account of the parts overlapping the ends A' of the mandrel are tapered, so that the amount of heat transmitted to the tire will diminish toward the outer ends of the mandrel, or the opening in the interior of the mandrel may be tapered toward the end, or other means provided whereby the heat will be graduated, as above stated. Thus the function of the tapered ends A' of the mandrel A is to effect a gradual diminution of application of heat from the highly-heated part of the article to the point not at all heated.

A preferred form of the second vulcanizing member consists of a steam-generator B', having a basin-like shape, and upon this is built a member B², which forms part of the steam-generator. The two parts B' and B² are flanged at $b$ $b'$ and secured together by bolts $b^2$. The upwardly-extending member B² has a deep central recess or cavity B³, in which the tire to be treated is disposed, the cavity being open at both ends. The lower side of the channel with which the tire is in contact is shaped to conform to the exterior of the tire-cover in its inflated form or the form which it assumes on the wheel-rim. The walls of the part B² are hollow, as shown in Fig. 2, and being in direct communication with the water-space B⁴ of the generator the steam generated passes into the space B⁵ between the inner and outer walls of the part B². When the mandrel A is employed with this second member B, so that a patch or insertion may be vulcanized on both sides simultaneously, the mandrel is inserted into the cover at its inner side and pressure may be applied to the mandrel in any convenient manner.

The extent to which the vulcanization is carried may be regulated by controlling the steam entering the mandrel. Steam is conveniently supplied to the interior of the mandrel through a valve-controlled opening $B^6$, (see Fig. 1,) leading to the steam-space of the generator, and this steam is led by a flexible conduit $B^7$ and a conduit $A^2$, controlled by a valve $A^3$. By rotating the handle $a$ of the valve $A^3$ the amount of steam entering the mandrel from the generator may be regulated.

At its opposite end the mandrel A is provided with a conduit $A^4$, controlled by a valve $A^5$, by which air or water of condensation can be blown out from the mandrel by the entering steam when the apparatus is started.

The patch is preferably secured in place upon the tire by tape, or the clamping apparatus C may be employed for this purpose. This apparatus comprises a screw $C'$, having a plate $C^2$ curved to correspond to the shape of the mandrel. The screw passes through a screw-threaded block $C^3$, one end of which is provided with a point $C^4$, arranged to bear against one of the side walls of the channel, and at the other end is provided with an adjustable screw $C^5$, having a point bearing against the opposite wall of the channel, so as to hold the apparatus stationary. This apparatus may also be employed to supply pressure when a patch is being vulcanized on the tire without removing it from the wheel. In this case the mandrel is dispensed with and the tire, together with the wheel-rim, introduced into the channel of the main vulcanizing member B. A clamp C is then placed in position and the screw $C'$ adjusted so that the plate $C^2$ bears upon the rim of the wheel. The pressure may, however, be dispensed with and the patch vulcanized, as above described, the wheel being held in position in any convenient manner.

The upper faces $B^8$ of the side walls of the main vulcanizing member B are preferably flat, so that articles may be vulcanized on the flat or patches attached to small tires. Preferably a clamp is employed with this operation, and this consists conveniently of a lever D, hinged or pivoted at $d$ to a stationary support $D'$, which may be bolted or otherwise secured to the side walls of the member B, or it may be otherwise supported. The free end of the lever D has an opening through which passes a rod $D^2$ having a screw-threaded end on which fits a nut $D^3$ in such a manner that by turning the nut in one way or the other the pressure of the lever D upon the article can be regulated. The rod $D^2$ may be detachably secured to the apparatus.

Between the lever D and the article is preferably inserted a block $D^4$, of triangular or other shape, so as to distribute the pressure of the lever equally over the surface of the patch or insertion being vulcanized.

$B^9$ is a tube inserted into the steam-heated cavity between the outer and inner walls of the part $B^2$ and open at its upper end, which is level with the face $B^8$ of the channel-walls, and this tube is of such a nature that it can receive the valve of the tire for the purpose of vulcanizing it in place.

Conveniently the generator is supported on a casing F, having at its upper end openings $F'$ and similar openings $F^2$, which are situated at intervals around its periphery. At the lower end of the casing there is a gas jet or burner G, the heat from the burner impinging on the bottom $B'$ of the generator and the products of combustion passing away by the openings $F'$ and $F^2$. The generator, however, may be heated by an oil-burner or an electric or other furnace or by any other appropriate means. In place of applying a heater direct to the generator steam, hot air, or the like may be supplied to the interior of the casing B from a generator or other source situated at a distance from the apparatus, the heat being conveyed by suitable conduits. When the heat is supplied from a source distant from the apparatus, the heat to the mandrel A or the member E may be supplied by a separate conduit, or the heat for these parts may be led from a conduit communicating with the casing B.

H is a pressure-gage, and J a safety-valve.

The generator is filled with water up to the level shown in Fig. 2, and overfilling of the generator is prevented by a cock K. (See Fig. 1.)

In place of a flexible conduit, as shown in Fig. 1, the steam may be conveyed from the interior of the part $B^2$ by a jointed conduit, as shown in Fig. 3. This conduit consists of three sections $B^{11}$, of metal tubing, connected at one end to a valve or cock $B^{12}$ on the part $B^2$ and at the other end to the mandrel A, universal or bell-and-socket joints $B^{10}$ being introduced at the parts shown.

Other attachments may be provided in accordance with the nature of the articles to be vulcanized, and two or more channels $B^3$ may be provided, so that tires of various diameters can be treated in the same apparatus, and it is not intended to limit the invention to the details of construction above given, as these may be varied in accordance with requirements.

What I claim as my invention, and desire to secure by Letters Patent, is—

1. In a vulcanizing apparatus, the combination of an outer mold for an article of curvilinear form, an inner rigid mandrel having a curvilinear axis and formed to make firm contact with the inner surface of the article, and means for heating the outer mold and the inner mandrel.

2. In a vulcanizing apparatus for a hollow article of curvilinear form, the combination with an outer mold having walls forming a jacket and adapted for firm contact with the article, of an inner hollow rigid mandrel having a curvilinear axis and adapted for firm contact with the inner surface of the hollow article, means for supplying a heating medium to the jacket of the outer mold, and means for supplying a heating medium to the interior of the mandrel.

3. In a vulcanizing apparatus for hollow articles of curvilinear form, the combination of a hollow rigid mandrel having a curvilinear axis and adapted for firm engagement with the inside of the article to be treated, and means for supplying heat to the interior of the mandrel.

4. In a vulcanizing apparatus the combination with a channel-mold open at both ends, of jacketed walls for the mold, a hollow valve-tube-receiving member inserted into the space between the walls, a dished base communicating with the space between the walls and heating means disposed beneath the base.

5. In an apparatus for vulcanizing tire-covers, the combination of a hollow rigid mandrel for the tire-cover, means for supplying a heating medium to the interior of the mandrel, a mold for the tire-cover and means for heating the mold.

6. In a vulcanizing apparatus the combination with a dished member constituting a steam-generator of a mold-channel open at both ends and having hollow walls communicating with the steam-generator, a flat portion at the upper end of the walls, a hollow tubular valve-tube-receiving member closed at one end and let into the hollow space between the channel-walls and heating means disposed beneath the steam-generator substantially as described.

7. In a vulcanizing apparatus the combination with a steam-generator of a mold-channel having hollow walls communicating with the generator, a hollow mandrel between which and the channel-mold the article to be treated is placed, means for conveying steam from the generator to the interior of the mandrel and means for supplying heat to the generator.

8. In a vulcanizing apparatus the combination with a steam-generator of a mold-channel having hollow walls communicating with the generator, a hollow mandrel having tapered ends and means for supplying heat to the generator.

9. In a vulcanizing apparatus the combination with a steam-generator of a mold-channel having hollow walls communicating with the generator, a hollow mandrel, tapered ends to the mandrel, a flexible conduit between the generator and the mandrel, and means for supplying heat to the generator.

10. In a vulcanizing apparatus the combination with a steam-generator of a mold-channel having hollow walls communicating with the generator, a hollow mandrel, tapered ends to the mandrel, a flexible conduit between the generator and the mandrel, a valve on the conduit and means for supplying heat to the generator.

11. In a vulcanizing apparatus the combination with a steam-generator of a mold-channel having hollow walls communicating with the generator, a hollow mandrel, tapered ends to the mandrel, a flexible conduit between the generator and the mandrel, a valve on the conduit, a blow-off cock on the mandrel and means for supplying heat to the generator.

12. In a vulcanizing apparatus the combination with a dished member constituting a steam-generator of a mold-channel open at both ends and having hollow walls communicating with the steam-generator, a flat portion at the upper end of the walls, a hollow tubular member closed at one end and let into the hollow space between the channel-walls, a second hollow member between which and the channel-mold the article to be vulcanized is placed and heating means disposed beneath the steam-generator substantially as described.

13. In a vulcanizing apparatus the combination with a dished member constituting a steam-generator, of a mold-channel open at both ends and having hollow walls communicating with the steam-generator, a flat portion at the upper end of the walls, a hollow tubular member closed at one end and let into the hollow space between the channel-walls, a second hollow member between which and the channel-mold the article to be vulcanized is placed, a flexible valve-controlled conduit between the steam-space of the generator and the second hollow member, and heating means disposed beneath the steam-generator substantially as described.

14. In a vulcanizing apparatus the combination with a dished member constituting a steam-generator, of a mold-channel open at both ends and having hollow walls communicating with the steam-generator, a flat portion at the upper end of the walls, a hollow tubular member closed at one end and let into the hollow space between the channel-walls, a hollow mandrel, tapered ends to the mandrel, a flexible valve-controlled conduit between the generator and the mandrel, a blow-off cock on the mandrel and heating means disposed beneath the steam-generator substantially as described.

15. In a vulcanizing apparatus the combination with a channel-mold open at both ends and having hollow walls of a steam generator consisting of a dish-shaped member communicating with the hollow walls, a stand for the generator, having openings in its walls, a burner beneath the generator and supported in the stand, a flat portion at the upper end of the hollow walls, a hollow cylindrical member closed at one end and inserted in the hollow walls, a second hollow vulcanizing member, between which and the channel-mold the article to be vulcanized is placed, a flexible conduit between the steam-space of the generator and the second member, a valve on the conduit, a blow-off cock on the second member, and a clamp for pressing the article onto the vulcanizing-surface.

16. In a vulcanizing apparatus the combination with a channel-mold open at both ends and having hollow walls of a steam-generator consisting of a dish-shaped member communicating with the hollow walls, a stand for the generator having openings in its walls, a burner beneath the generator and supported in the stand, a flat portion at the upper end of the hollow walls, a hollow cylindrical member closed at one end and inserted in the hollow walls a hollow mandrel having tapering ends and constituting the second hollow vulcanizing member, between which and the channel-mold the article to be vulcanized is placed, a flexible conduit between the steam-space of the generator and the second member, a valve on the conduit, a blow-off cock on the second member, and a clamp for pressing the article onto the vulcanizing-surface.

17. In a vulcanizing apparatus, the combination of an outer mold for an article of curvilinear form, an inner rigid mandrel having a curvilinear axis and formed to make firm contact with the inner surface of the article, means for heating the outer mold and the inner mandrel, and means for independently regulating the heat of the mandrel.

18. In a vulcanizing apparatus for a hollow article of curvilinear form, the combination with an outer mold having walls forming a jacket and adapted for firm contact with the article, of an inner hollow rigid mandrel having a curvilinear axis and adapted for firm contact with the inner surface of the hollow article, means for supplying heat to the jacket of the outer mold, means for supplying heat to the interior of the mandrel, and means for independently regulating the heat of the mandrel.

In testimony whereof I have signed my name to this specification in the presence of two subscribing witnesses.

H. HARVEY FROST.

Witnesses:
   PERCY G. GATTER,
   H. D. JAMESON.